Aug. 19, 1952     H. W. HAPMAN     2,607,469
FLIGHT CONVEYER

Filed June 13, 1946     3 Sheets-Sheet 1

Inventor
Henry W. Hapman

Aug. 19, 1952     H. W. HAPMAN     2,607,469
FLIGHT CONVEYER

Filed June 13, 1946     3 Sheets-Sheet 2

INVENTOR.
Henry W. Hapman
BY Barthel & Bugbee
ATT'Y'S

Patented Aug. 19, 1952

2,607,469

UNITED STATES PATENT OFFICE 2,607,469

FLIGHT CONVEYER

Henry W. Hapman, Detroit, Mich., assignor, by mesne assignments, of forty per cent to Hannah Jane Hapman, Detroit, Mich.

Application June 13, 1946, Serial No. 676,546

18 Claims. (Cl. 198—168)

This invention relates to conveyors, and in particular, to flight conveyors.

One object of this invention is to provide a flight conveyor capable of turning corners and bends in a conduit without the need for guide sprockets or pulleys at such corners or bends.

Another object is to provide a flight conveyor capable of torsional twisting, whereby the flights may be gradually inverted or turned around the axis of the flexible member interconnecting them so that they adapt themselves automatically to varying directions and bends of the conduit in which they are installed.

Another object is to provide a flight conveyor, as set forth in the preceding objects, wherein the conveyor consists of horizontal courses but has its guide pulleys or sprockets at the ends thereof disposed in vertical planes, whereby gravity transfer of the conveyed material from the upper course to the lower course will occur before the flights reach the sprocket or pulley, so that the conveyor is not required to force the conveyed material around the sprocket or pulley as prior conveyors have required, with a necessarily great expenditure of power.

Another object is to provide a flight conveyor, as set forth in the preceding objects, wherein the flights are at least partially of elastic deformable material, such as rubber or synthetic rubber and wherein means is provided for the automatic take-up of wear in the conveyor chain to which the flights are attached.

Another object is to provide a flight conveyor, as set forth in the preceding objects, wherein the links of the conveyor chain to which the flights are attached have relatively large clearances with respect to their pivot pins and wherein elastic deformable washers, such as rubber or rubber-like material, are inserted between the links, preferably in a precompressed condition, so that this construction not only excludes foreign matter of abrasive action from the pivotal connections between the links and pivot pins, but also permits torsional twisting of the conveyor chain so that the flights become self-aligning with respect to bends or turns in the conveyor conduit, and if necessary, even completely inverted within a relatively short distance, but will turn back to their proper positions upon approaching a sprocket or pulley over which they must pass.

Another object is to provide a flight conveyor, as set forth in the preceding objects, wherein the links and rubber-like washers are urged constantly into engagement with one another by yielding means, such as springs connected to the pivot pins and engaging the links.

Another object is to provide a flight conveyor, as set forth in the preceding objects, wherein flights of elastic deformable material, such as rubber or synthetic rubber, are clamped between plates or half discs with relatively large clearances between the flights and clamping fasteners so that the disc halves are urged toward one another by spring members connected to the pivot pins and engaging the chain links for urging the links into engagement with elastic deformable washers for the automatic take-up of wear.

Another object is to provide a flight conveyor, as set forth in the object immediately preceding, wherein the flights are particularly well adapted for large diameter conduits and an economy is effected in the quantity of the relatively expensive rubber or synthetic rubber required for the flights by providing annular bodies of such rubber or synthetic rubber clamped between the peripheral portions of opposing disc-like flights.

Another object is to provide a flight conveyor, as set forth in the object immediately preceding, wherein the annular rubber flight portions are clamped between half discs separated by gaps so that they are interconnected only by the rubber portions and by the fasteners inserted through holes having a relatively large clearance therebetween, whereby the half discs may be drawn toward one another by the automatic wear take-up construction or may tilt relatively to one another transversely to the conveyor chain as the conveyor undergoes torsional twisting in passing around bends or loops in the conveyor courses.

Another object is to provide a flight conveyor, as set forth in the preceding objects, and also a conveyor chain having link holes of relatively larger diameter than the pivot pins so that a relatively large clearance exists therebetween, thereby permitting not only torsional twisting of the chain, but also permitting the links on one side of the chain to slide lengthwise relatively to the links on the other side of the chain, so that the chain may become elongated on one side relatively to the other side and thereby execute a bend in a plane containing the axes of the pivot pins.

Another object is to provide a flight conveyor, as set forth in the preceding objects, and so constructed and arranged that it will undergo torsional twisting throughout one or more of its courses but such that the flights will maintain their relative positions of tilt in their initial settings at various locations throughout the bends and turns of the conveyor courses during subsequent operation.

Another object is to provide a flight conveyor, as set forth in the preceding objects, wherein the conveyor chain or other flexible connecting and propelling member is connected eccentrically to the flights so that the weight of the flights by the action of gravity will tend to hold them in relatively constant angles of tilt at given portions of the bends or turns in the various courses of the conveyor during the entire period of operation thereof.

Another object is to provide a flight conveyor, as set forth in the object immediately preceding, which is especially well adapted for the conveying of tightly packed material around relatively short turns or bends, the eccentric connection of the flexible propelling member, such as the conveyor chain, avoiding the cramping of the material adjacent the chain and hence making it possible to convey such relatively incompressible material as metallic sludge from oil tanks or the like.

Other objects and advantages of the invention will become apparent during the course of the following description of the accompanying drawings, wherein.

This is a continuation-in-part of my co-pending application Serial No. 605,252 filed July 16, 1945 and now Patent No. 2,557,963 granted June 26, 1951.

*Split disc flight conveyor with automatic wear take-up and twistable chain*

Figures 1, 2, 3, 4, 5:
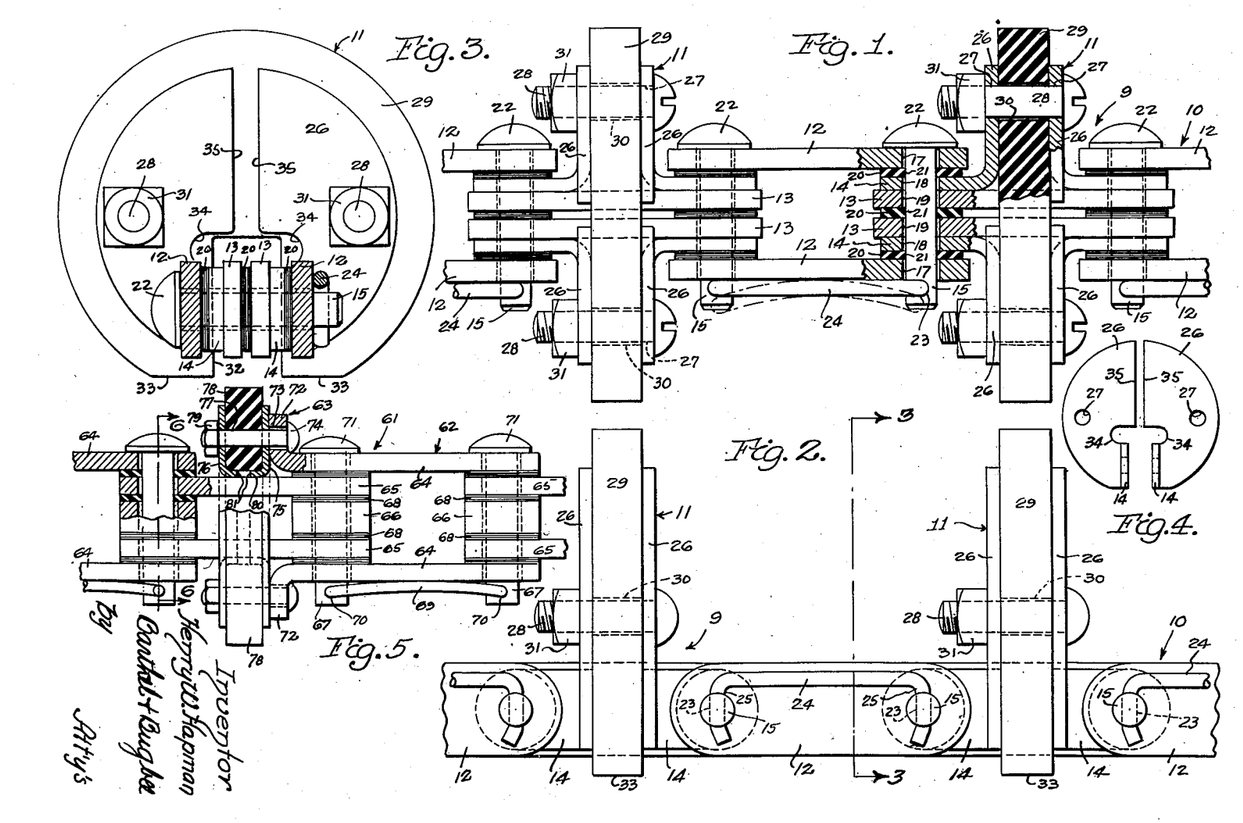
Figure 1 is a top plan view, partly in section, of a portion of a flight conveyor according to a preferred embodiment of the invention.
Figure 2 is a side elevation of the flight conveyor portion shown in Figure 1.
Figure 3 is a vertical section along the line 3—3 in Figure 2.
Figure 4 is a front elevation of a pair of half discs used in the flight conveyor of Figures 1 to 3 inclusive.
Figure 5 is a top plan view of a modification of Figure 1 having full discs instead of the half discs shown in Figure 4.

Referring to the drawings in detail, Figures 1 to 4 inclusive show a portion of a flight conveyor, generally designated 9, consisting of a conveyor chain and conveyor flights mounted thereon, generally designated 10 and 11 respectively in offset positions (Figure 2). The conveyor chain 10 consists of outer links 12, inner links 13 and L-shaped brackets or clamping plates 14 pivotally connected by pivot pins 15 passing through enlarged holes 17, 18 and 19 therein. Interposed between the members 12, 13 and 14 (Figure 1) are resilient washers 20 of elastic deformable material, such as rubber or synthetic rubber, with holes 21 therein fitting snugly around the pivot pins 15. The link members 12 and 13 and clamping plates 14 are preferably formed as stampings, and their holes 17, 18 and 19 formed of considerably larger diameter than the pivot pins 15 in order to provide a relatively large amount of play therebetween. In other words, the pivot pins 15 may be described as having a "sloppy fit" in the holes 17, 18 and 19.

Each pivot pin 15 is provided at one end thereof with an enlarged head 22 and at its opposite end with a transverse hole 23 for receiving a retaining spring member 24 having angled end portions 25 (Figure 2) passing through the holes 23 and bent therebeyond to prevent their being accidentally withdrawn. In their normal positions, the members 24 are of arcuate form, as shown by the chain lines in Figure 1. In assembling the chain 10, however, the members 24 are sprung into straight-line form against the adjacent outer links 12 so as to urge the links 12 and 13 and the clamping plates 14 into engagement with each other and with the rubber-like washers 20.

The outer ends of the clamping plates 14 are bent in opposite directions (Figure 1) to provide semi-circular portions or half discs 26 (Figures 3 and 4) having holes 27 for receiving fasteners 28 by which the flight portions 29 are clamped between adjacent pairs of disc halves 26. The flight portions 29 are of elastic deformable material, such as rubber or synthetic rubber, and are provided with enlarged holes 30 for receiving the fasteners 28 and permitting a relatively large clearance therebetween for the take-up of wear, as hereinafter explained. For example, in one such installation the flight holes 30 were of $\frac{13}{32}$ inch diameter to receive $\frac{5}{16}$ inch bolts, thereby providing a $\frac{3}{32}$ inch clearance. Threaded on the ends of the fasteners 28 are nuts 31 which are tightened to finger tightness after which the outer ends of the fasteners 28 are hammered to enlarge them in rivet fashion so as to prevent the nuts 31 from dislodgement and loss. The flight portions 29 are also provided with rectangular notches 32 for the passage of the inner links 13 therethrough, and are also provided with flattened bottom portions 33 (Figure 3). Each half disc 26 is also provided with a transversely-extending notch 34 immediately below the adjacent edges 35 of the half discs 26.

Figure 7:
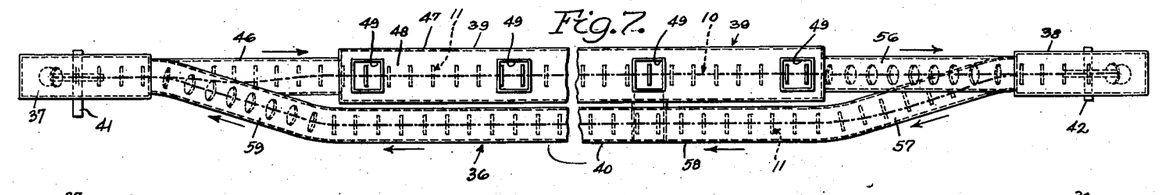
Figure 7 is a diagrammatic top plan view of a runaround conveyor installation employing the flight conveyor shown in Figures 1 to 4 inclusive as arranged for gravity transfer of the conveyed materials at opposite ends of the horizontal runs thereof.
Figure 8:
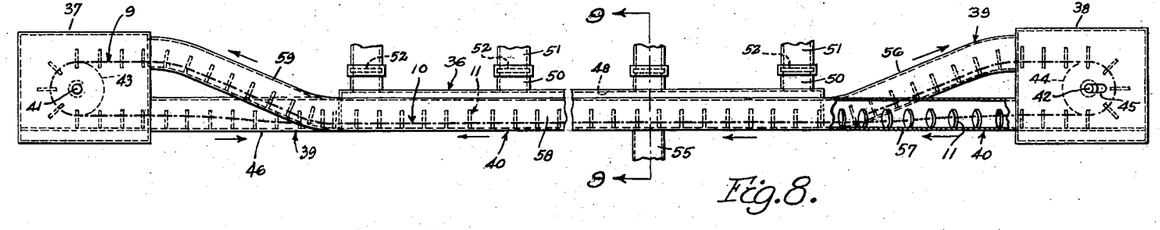
Figure 8 is a side elevation, partly in section, of the conveyor installation shown in Figure 7, showing the gradual twisting of the conveyor chain and consequent gradual tilting of the flights as they traverse a bend in the conveyor conduit.
Figure 9:
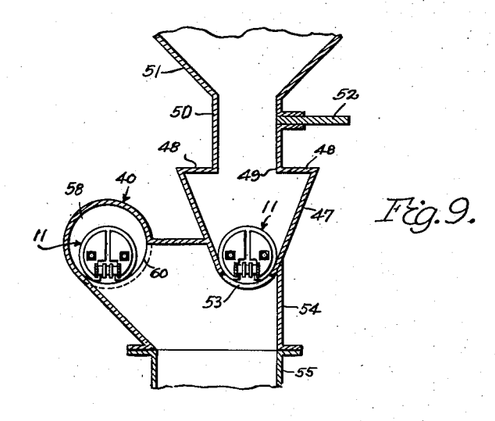
Figure 9 is a vertical section along the line 9—9 in Figure 8, showing means for discharging the conveyed material from oppositely proceeding adjacent courses of the conveyor into a common discharge duct.

Figures 7 to 9 inclusive show a typical installation wherein the flight conveyor 9 is mounted in a conduit system, generally designated 36 and consisting of vertically arranged housings 37 and 38 interconnected by bent conduits 39 and 40 respectively. Mounted in the housings 37 and 38 are shafts 41 and 42 carrying sprockets 43 and 44 meshing with the conveyor chain 10. One of the shafts, preferably 41, is driven by a motor and reduction gear unit of conventional design (not shown), and take-up for slack in the conveyor 9 is accomplished by moving one of the shafts away from the other, as indicated by the elongated slots 45. This take-up mechanism is likewise conventional and well known and its details form no part of the present invention.

The bent conduit 39 consists of a straight portion 46 leading from the bottom part of the housing 37 to a trough-like conduit portion 47 (Figures 6 and 8) having a cover portion 48 at the top thereof. The cover portion 48 is provided at intervals with apertures 49 connected by conduits 50 to hoppers 51. Slidable into and out of the conduits 50 are valve members 52 (Figure 8) shown diagrammatically and permitting the cutting off of any one of the hoppers 51 from discharging through its opening 49 into the trough-like portion 47. Below one of the apertures 49, the trough-like portion 47 is provided with an opening 53 (Figure 8) through which the material conveyed drops into a casing 54 and thence through a vertical conduit or downspout 55 to a weighing scale (not shown) or to other means for transporting or utilizing the conveyed material (not shown). For example, the hoppers 51 may consist of the lower ends of coal bunkers in which coal is stored for conveyance by the conveyor 9 to the conduit 55 for weighing or further transporting. The installation shown in Figures 7 and 8 may thus be used in a power house where an accurate record is kept of the amount of coal consumed. It may also be used in any other establishment where it is desired to draw material from different storage hoppers or bins and convey it to other locations.

Beyond the trough-like portion 49, the bent portion 39 continues in an upwardly inclined portion 56 leading to the top part of the housing 38. Leading from the lower portion of the housing 38 is an outwardly bent portion 57 of the bent conduit 40. The latter continues in a substantially rectilinear portion 58 which is approximately parallel to the trough-like portion 47 (Figure 7) and which at its opposite end is connected to an upwardly inclined portion 59 leading to the top part of the housing 37. The straight conduit portion 58 is provided with an opening 60 near the bottom thereof (Figure 8) which also opens into the casing 54 so as likewise to discharge material into the conduit 55.

Operation

In the operation of the form of the invention shown in Figures 1 to 4 and 7 to 9 inclusive, the flight conveyor 9 is mounted in the casings 37 and 38 and bent conduits 39 and 40 in the manner shown in Figures 7 and 8. The construction of the conveyor 9 with its resilient washers 20 of rubber-like material and its large clearances between the pivot pins 15 and fasteners 28 and their respective holes, makes it possible to twist the conveyor 9 torsionally in the direction of its length out of the normal position of Figure 2, in which the conveyor 9 tends to operate. The conveyor 9 tends to assume the position shown in Figure 2 because of the weight of the conveyor chain 10 and its position near the bottom of each flight 11 (Figures 2 and 3). Because of the twisting capability of the conveyor 9, however, the bottom surfaces of the flight portions 29 may swing outwardly gradually when traversing certain portions of the conduit system 36 and permits the flights 11 to become completely inverted within a relatively short length thereof.

Let it be assumed that the shaft 41 and sprocket 43 are driven in a counterclockwise direction so as to cause the conveyor 9 to travel in the direction of the arrows (Figure 8), and that the hoppers 51 are filled with the material to be conveyed, such as coal. Let it be further assumed for purposes of illustration that it is desired to draw coal from the first opening 49 (Figure 7) and convey it to the weighing machine below the conduit 55 beside the third opening 49.

For mechanical reasons, it is obviously necessary that the conveyor chain 10 lie adjacent the rims of the sprockets 43 and 44 in order for it to mesh with the sprocket teeth. Hence the flights 11 must project outwardly therefrom with their base portions 33 also adjacent the sprocket rim. When the flights 11 reach the horizontal portions 47 and 58 of the conveyor system 36, however, they should be upright with their base portions 33 adjacent the bottom of the conveyor conduit. Since the weight of the conveyor chain 10 is applied eccentrically of the flights 11, being connected thereto near their bottom portions 33, it will tend to cause the flights 11 to assume these upright positions. Moreover, the resilient-washer and loose-fit construction previously described permits the conveyor chain to twist torsionally in the direction of its length in order to permit the flights 11 to turn into upright positions.

In particular, as the flights 11 pass around and leave the underside of the sprocket 43 and depart from the lower portion of the housing 37, they are inverted, with the chain 10 uppermost. Since the bottom of the conduit section 46 is of arcuate cross-section and the flight portions 29 are also substantially circular, the weight of the chain 10 applied eccentrically to the flights 11 gradually turns them around as the conveyor 9 traverses the conduit portion 46, as shown at the left-hand end of Figure 8. Consequently, when the flights 11 enter the conduit portion 47, they are upright even though they were inverted when they left the sprocket 43.

As the conveyor 9 passes beneath the first hopper opening 49, and its slide valve 52 is open, the material drops down into the conduit portion 48 and is conveyed toward the right in the direction of the arrow (Figure 7). Even though the flights 11 are smaller than the cross-sectional area of the conduit portion 47, the material is nevertheless conveyed, either directly by the flights 11 themselves or by "induced flow" resulting from the motion of the directly conveyed particles being transmitted to the particles of material out of direct contact with the flights 11. As a consequence, the material moves along the conduit portion 47, passing beneath the second opening 49 (Figure 7), the slide valve 52 of which is assumed to be closed. As it passes beneath the third opening 49, however, the major part of the conveyed material drops downwardly through the opening 53 (Figure 9) in the bottom of the conduit portion 47 into the casing 54 and thence downwardly through the conduit 55 to the weighing machine or other apparatus by which it is processed or transported.

In actual practice, it is found that not all of the material drops down through the opening 53 but a certain portion of it is conveyed onward, due to the tendency of the particles to cling together. The undumped material thus conveyed passes onward through the remainder of the conduit portion 47 and is conveyed upwardly through the inclined conduit portion 56 into the upper portion of the housing 38. Before this material reaches the sprocket 44, however, it passes through a portion of the housing 38 where it is unsupported by any conduit, hence the material drops to the bottom of the housing 38 by the action of gravity.

Thus, the chain 10 with its flights 11 passes around the sprocket 44 without being impeded by the presence of the material, as in prior conveyors where horizontal sprockets are employed. The gravity transfer of material prior to reaching the sprocket, according to the present invention, results in a great saving of power. Thus a smaller motor can be used than in prior installations where the material has to be carried forcibly around the sprocket and conduit.

The necessity previously of carrying the material around the sprocket and conduit in so-called run-around conveyors where the conveyor and conduit lie in generally horizontal planes, has consumed a great amount of power because of the packing of the materials and their resistance to being forced around a curved path. Furthermore, the connection and pivoting of the conveyor chain 9 near the bottoms of the flights 11 further reduces the resistance of the particles in traversing bends, since the flights do not have the tendency to compress the material on the side adjacent the sprocket as in conveyors where the chain is connected and pivoted near the centers of the flights, and hence where the spaces between the flights diminishes adjacent the sprocket or bend. In the present invention, the spaces between the flights do not diminish near the sprocket, but increase near their outer ends as the flights pass around a bend or a sprocket and the material actually has a larger space which it may occupy instead of a more restricted space as in prior center-connected conveyors. This is especially important in the conveying of densely packed, incompressible material, such as powdered cast iron in cutting fluid sludge.

The flights 11 emerge from the bottom of the sprocket 44 in inverted positions as shown at the right-hand end of Figure 8, and immediately enter the outwardly bent portion 57 of the return course 40 of the conveyor conduit 39 (Figure 7). Here again, the resilient-washer and loose-fit construction of the conveyor 9 causes the chain 10 to gradually turn the conveyor flights 11 around so as to revert them to their upwardly directed positions as they enter and traverse the straight conduit portion 58. As the conveyor flights 11 pass the opening 60 (Figure 9), the major portion of the remaining material which was not dumped through the opening 53 is now dumped through the opening 60.

The conveyor is thus substantially cleared of its material as it passes along the remainder of the straight conduit portions 58 and up the bent portion 59 into the housing 37 into engagement with the sprocket 43. Since the conveyor flights 11 and chain 10 are now in their proper positions for engagement with the sprocket 43, the flights 11 do not require inversion as they pass through the inclined portion 59, hence torsional twisting is not required during this part of the run. The operation thenceforth proceeds in the manner previously described, as the conveyor 9 makes another circuit of the conduit system 39.

Should it happen, however, that the downspout 55 (Figure 9) is full of material while more material is being conveyed to it by the conveyor 9, the latter will merely convey the material onward by the inclined portion 56 into the housing 38 where gravity transfer again occurs before reaching the sprocket 44, the materials being conveyed onward through the return course 40. If the downspout 55 has been cleared by the time the material reaches the opening 60 in the straight portion 58 of the return course 40, the material drops downward through the downspout 55.

If, however, the downspout 55 is still full of material, the material in the straight portion 58 is merely conveyed onward through the return course 40, up the inclined portion 59 thereof into the housing 37. Here again the material drops down to the bottom of the housing 37 before reaching the sprocket 43 and is picked up again by the flights 11 after they leave the sprocket 43 and passes into the conduit portion 39 again. Thus, when the downspout 55 is full of material, the material in the conduit courses 39 and 40 merely is conveyed around the circuit without being dumped, yet only a small amount of power is consumed because of the gravity transfer of the material in the housings 37 and 38 before the sprockets 43 and 44 are reached. While this occurs, the conveyor flights 11 are inverted and reverted in the manner described above (Figures 7 and 8) as they pass through the various portions of the conduit system 36.

The conduit system 36 shown in Figures 7 and 8 is shown for convenience as a simplified system without bends or turns other than those necessary to present the chain 10 and flights 11 properly to the peripheries and teeth of the sprockets 43 and 44. It will be evident, however, that the resilient-washer loose-fit construction of the conveyor 9 permits other bends or turns to be made in the conduit system 39 as necessitated by the conditions of the particular building, locations of machinery, locations of sources of supply and discharge and other factors peculiar to the particular installation. Such bends and turns have been additionally used in installations actually made, and the resilient-washer and loose-fit construction of the conveyor 9 enables it to traverse these bends while the conveyor flights 11 and chain 10 are inverted or reverted as necessitated by these bends.

The present invention also avoids the necessity of having to convey the material through a complete circuit of the conduit system before dumping it into a gate or opening which was filled with material when the conveyor made its previous circuit. The dual discharge arrangement shown in Figure 9 necessitates the traverse of approximately only half of the circuit provided that the downspout 55 has been cleared by the time the undumped material arrives again at the downspout 55.

The flights 11, however, will maintain their initial settings as regards inversion or reversion while they are traversing the system, and the pivot pins will remain substantially at right angles to the plane of the turn or bend. In other words, in the conveyor of the present invention, it is not critical how the conveyor is installed in the conduit system because it will emerge properly when it reaches the sprockets or pulleys over which it must pass. The present conveyor, therefore, is self-aligning in the conveyor system in which it travels, and does not require the close tolerances, accurate fits and precise alignments of prior conveyor systems. It also does not require that the sprockets and conveyor courses remain in substantially the same plane, as in prior conveyor systems, particularly runaround conveyor systems.

Moreover, the resilient-washer construction enables the conveyor to twist torsionally in the direction of its length, yet the rubber-like washers will still protect the pivot pins because they will expand to fill the spaces between the links and will therefore keep abrasive materials out of the pivotal connections of the conveyor chain and flights.

The present invention also provides for automatic wear take-up in the link pivots while keeping abrasive material out of the latter. This results from the resilient washers 20 of rubber-like material between the members 12, 13 and 14 (Figure 1) and by the spring members 24. As wear occurs, the spring members 24 push the members 12, 13 and 14 more closely together, while the spring members 24 tend to assume their original arcuate positions shown in chain lines in Figure 1. At the same time, the edges 35 of the disc halves 26 are permitted to move more closely together because of the loose fit between the fasteners 28 and their holes 30 and also because the nuts 31 are merely finger-tight upon the fasteners 28. At all times, however, the rubber-like washers 20 prevent the entry of abrasive materials into the pivotal connections because they expand or contract according to the width of the gap which they fill.

*Modification with full disc clamping plates*

Figure 6:
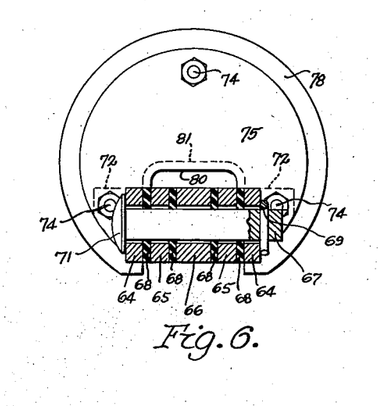
Figure 6 is a vertical section along the line 6—6 in Figure 5.

The modification shown in Figures 5 and 6 is generally similar to the form of the invention shown in Figures 1 to 4 and 7 to 9 inclusive, except that the half discs 26 are replaced by full discs. In particular, this modification generally designated 61 consists of a conveyor chain and conveyor flights, generally designated 62 and 63 respectively. The conveyor chain 62 consists, as before, of outer and inner links 64 and 65 respectively, the latter being separated by spacing collars 66. The links 64 and 65 and collars 66 are mounted upon pivot pins 67 with a considerable clearance or loose fit between them similar to that shown and described in connection with Figure 1. Elastic deformable washers 68 of rubber-like material are interposed between these various members and they are compressed by the urging of similar spring-retaining members 69 inserted in holes 70 in the ends of the pivot pins 67, which at their opposite ends have enlarged ends 71.

The outer links 64 are provided with outwardly bent portions 72 having enlarged holes 73 therein for receiving clamping bolts 74 and providing a lose fit therebetween. For example, in one such installation, the holes 73 were of $\frac{9}{16}$ inch diameter to receive clamping bolts 74 of ½ inch diameter. The clamping bolts 74 also pass through clamping discs 75 and 76 and also through holes 77 in flight portions 78 of elastic deformable material, such as rubber or synthetic rubber. Threaded on the outer ends of the clamping bolts 74 are nuts 79 threaded to finger tightness, as before, and secured in position by mutilating and enlarging the ends of the bolts 74. The discs 75 and 76 are provided with U-shaped notches 80 with inwardly-turned portions 81 for the passage of the inner links 65, and for more securely retaining the flight portions 78 in position.

The operation of the modification shown in Figures 5 and 6 is generally similar to the principal form shown in Figure 1, in that the conveyor 61 is also capable of torsional twisting in the direction of its length so that it can follow a conduit system with various bends and turns similar to the conduit system 36 in Figures 7 to 9, and can also adapt itself to the use of sprockets moving in a plane at an angle to the general plane of the conveyor conduit. Since the clamping discs 75 and 76 are not split, however, automatic wear take-up is effected by the loose fit between the angle portions 72 and the fastening bolts 74 so that as the outer links 64 are urged toward one another by wear, the bent portions 72 are likewise pulled inwardly toward one another, this motion being permitted by the loose fit between the holes 73 and clamping bolts 74.

*Modified conveyor for large diameter conduits*

The modification shown in Figures 10 to 17 inclusive is similar in principle to the forms of the invention shown in Figures 1 to 9 inclusive except that it is particularly well-adapted for installation in conveyor conduits of large diameters. This modification makes it possible to economize on the amount of elastic deformable material used in the flights, synthetic rubber in such sizes of flights being an expensive factor if solid disc-like flights are to be used. The modification of Figures 10 to 17 inclusive, accordingly, employs annular flight members of rubber-like material instead of the substantially solid discs employed in the previous form of the invention.

In particular, the modified conveyor, generally designated 82 consists of a conveyor chain and flight units, generally designated 83 and 84 respectively. The chain 83 consists, as before, of outer links 85 and inner links 86 mounted with a loose fit upon pivot pins 87 and having rubber-like sealing washers 88 therebetween. The pivot pins 87 are provided with heads 89 adjacent to which are elongated bent springs 90 (Figures 16 and 17) having eyes 91 at their opposite ends for encircling the pivot pins 87. The opposite ends of the pivot pins 87 are provided with transverse holes 92 (Figure 13) for receiving cotter pins or other suitable retaining members 93, backed by washers 94 of metal or other suitable material.

The chain 83 is assembled in such a manner that the bent springs 90 are flattened against their adjacent outer links 85 (Figure 11), thereby placing the rubber-like washers 88 in compression. As wear occurs, however, the bent springs 90 tend to assume their bent shape shown in Figure 16, thereby automatically taking up wear occurring along the pivot pins 87. The resilient washers 88 maintain a tight seal as before and exclude abrasive material which otherwise would cause wear. They also permit torsional twisting of the chain 83 in the direction of its length, thereby enabling the conveyor 82 to be used in installations similar to that shown in Figures 7 to 9 inclusive and described above, with all the advantages thereof.

Figures 10, 11, 12, 13, 14, 15, 16, 17:
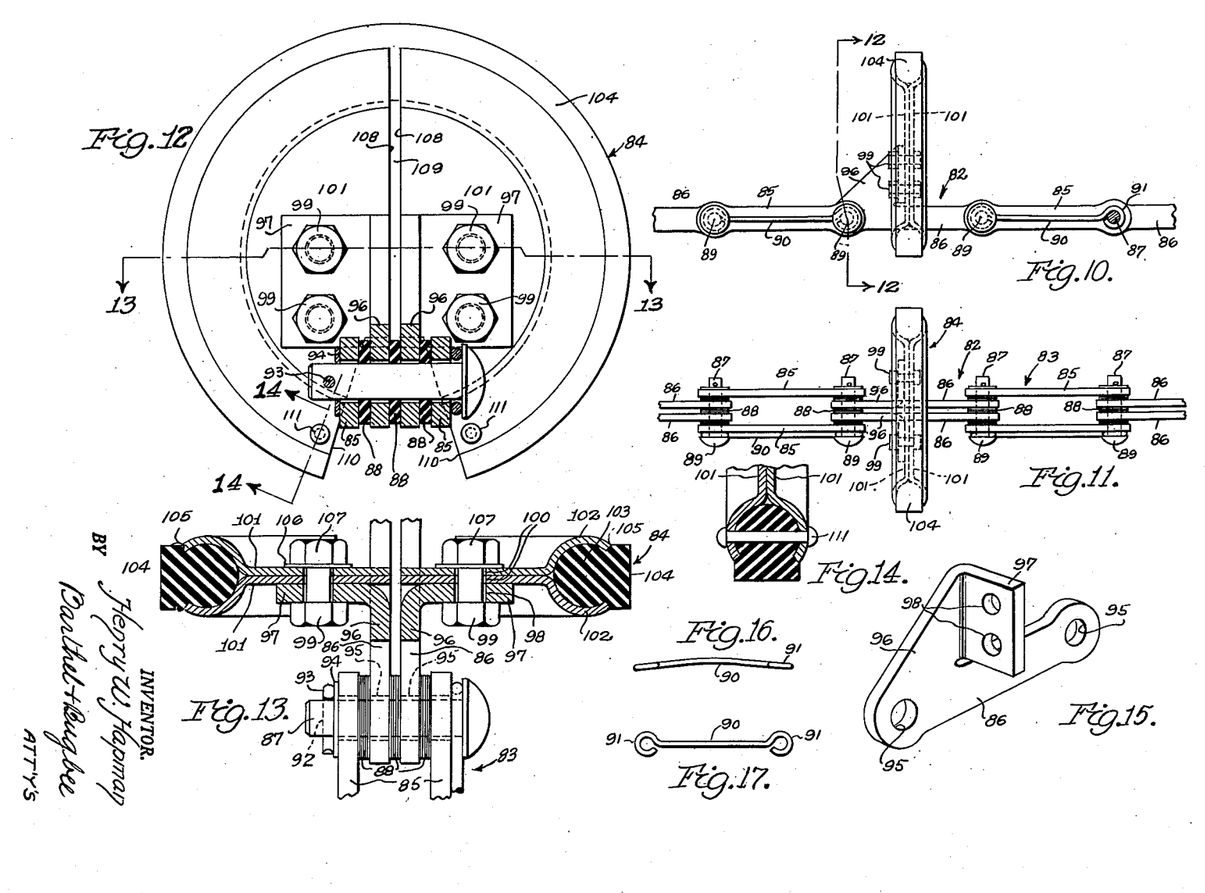
Figure 10 is a side elevation of a second modification of Figure 1 showing a flight conveyor which is especially well adapted for installation in large diameter conduits.
Figure 11 is a top plan view of the modified conveyor shown in Figure 10.
Figure 12 is an enlarged cross-sectional view through the modification shown in Figure 10, taken along the line 12—12 therein.
Figure 13 is a horizontal section taken along the line 13—13 in Figure 12.
Figure 14 is a fragmentary inclined section taken along the line 14—14 in Figure 12.
Figure 15 is a perspective view of one of the link brackets for securing the flights to the conveyor chain in the modification shown in Figures 10 to 14 inclusive.
Figure 16 is a top plan view of a wear take-up spring shown in use in Figure 11.
Figure 17 is a side elevation of the wear take-up spring shown in Figures 10 and 16.

The inner links 86, however, are of the form shown in Figure 15 and are stamped from single pieces of metal or other suitable material. The links 86 have enlarged holes 95 for receiving the pivot pins 87 and are also provided with upwardly extending portions 96 having their ends 97 bent laterally at right angles. The ends 97 are provided with holes 98 for receiving clamping bolts 99 with a loose fit and large clearances therebetween (Figure 13). The clamping bolts 99 pass also through similarly enlarged holes 100 in oppositely facing clamping disc halves 101 having peripheral portions 102 of oppositely curved configuration so that in assembly they form an annular recess for receiving and gripping the inner part 103 of annular flight portions 104. The parts 103 are of cross-section slightly greater than semi-circular so as to be effectively retained in position by the gripping action of the outer edges 105 of the peripheral portions 102. The clamping bolts 99 are provided with washers 106 and nuts 107 threaded on the ends thereof to finger-tightness and secured by upsetting the ends of the bolts 99 as before.

The half discs 101 are thus separated at their edges 108 by gaps 109 extending entirely through the flight units 84. The half-discs 101 are cut away as at 110 to collectively provide a passageway for the inner links 86. The annular flight portions 104 at their opposite ends are provided with retaining pins 111 extending therethrough and serving to anchor the flight portions 105 to the disc halves 101 during the assembly of the conveyor. After the conveyor 82 has been installed in a conduit, the walls of the conduit itself tend to retain the flight portions 104 within the half-disc portions 102 even though the pins 111 should fail or be missing.

The operation of the modification shown in Figures 10 to 17 inclusive is also similar to that of the forms of the invention shown in Figures 1 to 9 inclusive. The chain 83 has the same qualities and advantages of torsional twisting in the direction of its length and also automatic wear take-up and protection of the pivot pins 87 by reason of the rubber-like washers 88. In addition, the disc halves 101 can twist slightly relatively to one another, because of the enlarged holes 98 and 100, and the resilience of the annular form of the flight portions 104, so that the gap 109 between them (Figure 12) can open or close slightly as the necessity demands. The conveyor 82, like the conveyors previously described herein, can also traverse relatively short bends or turns and can likewise be used in a horizontal runaround conveyor of the type shown in Figures 7 and 8, using vertically disposed sprockets with their attendant advantages of gravity transfer of material.

All the forms of conveyors according to the present invention are easily cleaned so that they can accommodate and convey different materials according to the necessity of the moment or the season of the year. For example, in certain seasons, one type of material may be conveyed, and in other seasons, another type of material, thereby adapting the conveyor to a varying demand for different materials. Because of the large clearances between the pivot pins and links 85 and 86, as well as in the previously described forms of the invention, the links on one side can move in a direction lengthwise of the chain to a slight extent in traversing a bend, so that the pivot pins 87 are temporarily slightly non-parallel and the chain can bend somewhat in the plane of its pivot pins. This additional feature makes it still more self-accommodating to different operating conditions.

In all of the forms of the invention, the rubber-like washers between the various links of the chain can be assembled in a pre-compressed condition. When so precompressed, they will take up a greater amount of wear and also will continue to fill the gaps and exclude abrasive materials from the pivot pins when traversing relatively short bends of the conveyor conduit.

In some installations, it will be found that the rubber or rubber-like sealing washers and the loose fit construction of the chain, resulting from the excessively large clearances provided at the outset between the pivot pins and chain links, are useful without flights, such as, for example, on the slow speed end of a power-driving mechanism or speed reduction mechanism. In such instances, the sealing washers protect the pivotal connections of the chain from the entrance of foreign matter, such as abrasive particles, while permitting a certain amount of self-alignment during operation.

In other installations, where soft non-abrasive materials are being conveyed, such as powdered soft coal or grain, it will sometimes be found feasible to omit the sealing washers and also possibly to employ solid flights of non-deformable material, such as cast-iron, preferably mounted eccentrically and thereby obtain the advantages of torsional twisting of the chain and urging of the flights into upright positions without the necessity of protecting the pivotal connections. In still other installations, sealing washers of elastic deformable material are found useful while employing flights not made of elastic deformable material but made of metallic or plastic materials, which are much more rigid, either with conventional clearances in the pivotal connections so as to effect protection of the pivots alone, or with excessively loose clearances in order to effect not only this protection but also to permit torsional twisting with the advantages thereof as previously stated.

While I have shown and described my invention in detail, it is to be understood that the same is to be limited only by the appended claims, for many changes may be made without departing from the spirit and scope of my invention.

What I claim is:

1. A flight conveyor comprising a drive chain having pivot members and links interconnected thereby, said links being freely slidable axially along said pivot members sealing members of elastic deformable material mounted on said pivot members in sealing engagement with said links, conveyor flights connected to said chain at intervals therealong, and spring compression devices connected to said pivot members and engaging said links intermediate said pivot members for urging said sealing members into sealing engagement with said links.

2. A flight conveyor comprising a drive chain having pivot members and links interconnected thereby, said links being freely slidable axially along said pivot members opposed pairs of clamping members connected to said chain at intervals therealong, conveyor flights mounted between said pairs of clamping members, fasteners interconnecting said clamping members and said flights, elastic deformable sealing members mounted on said pivot members in sealing engagement with said links, said clamping members having excessively enlarged holes loosely receiving said fasteners, and yielding compression members engaging and urging said links axially along said pivot members into sealing engagement with said sealing members whereby to provide automatic wear take-up between said pivot members and said links while sealing said pivot members against the entrance of foreign matter.

3. A flight conveyor comprising a drive chain having pivot members and links interconnected thereby, said links being freely slidable axially along said pivot members opposed pairs of clamping members connected to said chain at intervals therealong, conveyor flights mounted between said pairs of clamping members, fasteners interconnecting said clamping members and said flights, elastic deformable sealing members mounted on said pivot members in sealing engagement with said links, said clamping members having excessively enlarged holes loosely receiving said fasteners, and spring devices connected to said pivot members and engaging and urging said links axially along said pivot members into sealing engagement with said sealing members whereby to provide automatic wear take-up between said pivot members and said links while sealing said pivot members against the entrance of foreign matter.

4. A flight conveyor for a conveyor conduit of circular cross-section comprising a drive chain having pivot members and links interconnected thereby, opposed pairs of clamping members connected to said chain at intervals therealong, substantially circular disc conveyor flights mounted between said pairs of clamping members, and fasteners interconnecting said clamping members and said flights, said links having excessively enlarged holes of materially greater sizes than said pivot members, said holes loosely receiving said pivot members and said members at their opposite ends having retaining elements of materially greater widths than the diameters of said pivot members, whereby to permit torsional twisting of said chain, said chain being connected to said clamping members eccentrically of said flights whereby the weight of said chain rotates said clamping members and flights into upright positions while said retaining elements retain said links and pivot members in assembly.

5. A flight conveyor comprising a drive chain having pivot members and links interconnected thereby, said links being freely slidable axially along said pivot members, clamping units connected to said chain at intervals therealong, conveyor flights mounted on said clamping units, fasteners connecting said flights to said clamping units, each clamping unit including a pair of laterally-spaced clamping members secured by said fasteners side by side to one side of each flight with a gap between the adjacent edges of said clamping members, elastic deformable sealing members mounted on said pivot members in sealing engagement with said links, and compression members engaging and holding said links and said sealing members under compression in sealing engagement with one another, said flights having excessively enlarged holes loosely receiving said fasteners whereby to effect movement of said clamping members toward one another and provide automatic wear take-up between said pivot members and said links while sealing said pivot members against the entrance of foreign matter.

6. A flight conveyor comprising a drive chain having pivot members and links interconnected thereby, said links being freely slidable axially along said pivot members conveyor flights, clamping units connected to said chain at intervals therealong, fasteners associated with said clamping units, each clamping unit including a pair of laterally-spaced clamping members secured by said fasteners side by side to one side of each flight with a gap therebetween, elastic deformable sealing members mounted on said pivot members in sealing engagement with said links, said flights having excessively enlarged holes loosely receiving said fasteners whereby to provide automatic wear take-up between said pivot members and said links while sealing said pivot members against the entrance of foreign matter, and spring devices connected to said pivot members and engaging said links for urging said sealing members into sealing engagement with said links.

7. A flight conveyor comprising a drive chain having pivot members and links interconnected thereby, said links being freely slidable axially along said pivot members sealing members of elastic deformable material mounted on said pivot members in sealing engagement with said links, conveyor flights connected to said chain at intervals therealong, said links having excessively enlarged holes loosely receiving said pivot members whereby to facilitate torsional twisting of said chain and lateral bending thereof in the planes of said pivot members, and compression members engaging and urging said links axially along said pivot members into sealing engagement with said sealing members.

8. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and compression members engaging and holding said links and said sealing members under compression in sealing engagement with one another.

9. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and compression members engaging and holding said links and said sealing members under compression in sealing engagement with one another, said clamping members having excessively enlarged holes loosely receiving said fasteners.

10. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and spring devices connected to said pivot members and engaging said links for urging said sealing members into sealing engagement with said links.

11. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and compression members engaging and holding said links and said sealing members under compression in sealing engagement with one another, said links having excessively enlarged holes loosely receiving said pivot members whereby to facilitate torsional twisting of said chain and lateral bending thereof in the planes of said pivot members.

12. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and spring devices connected to said pivot members and engaging said links for urging said sealing members into sealing engagement with said links, said links having excessively enlarged holes loosely receiving said pivot members whereby to facilitate torsional twisting of said chain and lateral bending thereof in the planes of said pivot members.

13. A flight conveyor comprising a drive chain having pivot members and links interconnected thereby, said links being freely slidable axially along said pivot members opposed pairs of clamping members connected to said chain at intervals therealong, the peripheries of said clamping members having annular grooves therearound, annular conveyor flights secured in said grooves between said pairs of clamping members, fasteners interconnecting said clamping members, elastic deformable sealing members mounted on said pivot members in sealing engagement with said links, and compression members engaging and urging said links axially along said pivot members, said links having excessively enlarged holes loosely receiving said pivot members whereby to facilitate torsional twisting of said chain, said chain being connected to said clamping members eccentrically of said flights whereby the weight of said chain urges said flights and clamping members into upright positions.

14. A flight conveyor apparatus comprising a pair of vertically-disposed conveyor housings located remote from one another, a tubular conduit system interconnecting said housings and having adjacently disposed horizontal courses displaced laterally from one another, said conduit system having outlets therein and upwardly-inclined portions terminating at their opposite ends in said vertically-disposed housings, rotary conveyor supports mounted in said housings on horizontal axes of rotation, an endless torsionally twistable flexible propelling member disposed in said conduit system and extending around said rotary supports, and substantially circular flights connected eccentrically to said propelling member at intervals therealong.

15. A flight conveyor apparatus comprising a pair of vertically-disposed conveyor housings located remote from one another, a tubular conduit system interconnecting said housings and having adjacently disposed horizontal courses displaced laterally from one another, said conduit system having outlets therein and upwardly-inclined portions terminating at their opposite ends in said vertically-disposed housings, rotary conveyor supports mounted in said housings on horizontal axes of rotation, a drive chain having pivot members and links loosely connected thereto disposed in said conduit system and extending around said rotary supports, and substantially circular flights connected eccentrically to said chain at intervals therealong.

16. A flight conveyor apparatus comprising a pair of vertically-disposed conveyor housings located remote from one another, a tubular conduit system interconnecting said housings and having adjacently disposed horizontal courses displaced laterally from one another, said conduit system having outlets therein and upwardly-inclined portions terminating at their opposite ends in said vertically-disposed housings, rotary conveyor supports mounted in said housings on horizontal axes of rotation, a drive chain having pivot members and links loosely connected thereto disposed in said conduit system and extending around said rotary supports, said links being freely slidably axially along said pivot members, sealing members of elastic deformable material mounted on said pivot members in sealing engagement with said links, compression members engaging and urging said links axially along said pivot members into sealing engagement with said sealing members and substantially circular flights connected eccentrically to said chain at intervals therealong.

17. A flight conveyor apparatus comprising a pair of vertically-disposed conveyor housings located remote from one another, a tubular conduit system interconnecting said housings and having adjacently disposed horizontal courses displaced laterally from one another, said conduit system having outlets therein and upwardly-inclined portions terminating at their opposite ends in said vertically-disposed housings, rotary conveyor supports mounted in said housings on horizontal axes of rotation, a drive chain having pivot members and links loosely connected thereto disposed in said conduit system and extending around said rotary supports, said links being freely slidably axially along said pivot members, sealing members of elastic deformable material mounted on said pivot members in sealing engagement with said links, substantially circular flights connected eccentrically to said chain at intervals therealong, compression members engaging and urging said links axially along said pivot members into sealing engagement with said sealing members and spring devices connected to said pivot members and engaging and urging said links axially into sealing engagement with said sealing members.

18. A flight conveyor for a conveyor conduit of circular cross-section comprising a drive chain having pivot members and links interconnected thereby, and substantially circular disc conveyor flights connected to said chain at intervals therealong eccentrically of said flights, said links having excessively enlarged holes of materially greater sizes than said pivot members, said holes loosely receiving said pivot members and said members at their opposite ends having retaining elements of materially greater widths than the diameters of said pivot members, whereby to permit torsional twisting of said chain and permit the weight thereof to rotate said flights into upright positions while said retaining elements retain said links and pivot members in assembly.

HENRY W. HAPMAN.

REFERENCES CITED

The following references are of record in the file of this patent:

UNITED STATES PATENTS

| Number | Name | Date |
|---|---|---|
| 505,296 | Pollock | Sept. 19, 1893 |
| 664,161 | Levalley | Dec. 18, 1900 |
| 761,034 | Dodge | May 24, 1904 |
| 777,377 | James | Dec. 13, 1904 |
| 901,789 | Dodge | Oct. 20, 1908 |
| 1,239,232 | Taylor | Sept. 4, 1917 |
| 1,804,701 | Mojonnier | May 12, 1931 |
| 1,933,653 | Bremer | Nov. 7, 1933 |
| 1,953,245 | Mackenzie | Apr. 3, 1934 |
| 2,110,204 | Davis | Mar. 8, 1938 |
| 2,124,485 | Dellenbach | July 19, 1938 |
| 2,235,991 | Hapman | Mar. 25, 1941 |
| 2,276,978 | Hyman et al. | Mar. 17, 1942 |
| 2,287,378 | Hapman | June 23, 1942 |
| 2,383,932 | Brunner | Sept. 4, 1945 |
| 2,389,874 | Searles et al. | Nov. 27, 1945 |
| 2,411,207 | Hait | Nov. 19, 1946 |